United States Patent [19]
Kuklinski

[11] Patent Number: 5,613,456
[45] Date of Patent: Mar. 25, 1997

[54] MICROBUBBLE POSITIONING AND CONTROL SYSTEM

[75] Inventor: Robert Kuklinski, Portsmouth, R.I.

[73] Assignee: The United States of America as represented by the Secretary of the Navy, Washington, D.C.

[21] Appl. No.: 492,831

[22] Filed: Jul. 28, 1995

[51] Int. Cl.⁶ .................................................. B63B 1/38
[52] U.S. Cl. ........................ 114/67 A; 114/330; 114/337
[58] Field of Search ................................. 114/67 A, 330, 114/337, 20.1; 55/277; 95/29, 30; 210/748

[56] References Cited

U.S. PATENT DOCUMENTS

| | | | |
|---|---|---|---|
| 3,827,388 | 8/1974 | Fulton | 114/67 A |
| 4,398,925 | 8/1983 | Trinh et al. | 95/30 |
| 4,429,652 | 2/1984 | Stol | 114/20.1 |
| 4,759,775 | 7/1988 | Peterson et al. | 210/748 |
| 5,117,882 | 6/1992 | Stanford | 114/67 A |
| 5,225,089 | 7/1993 | Benes et al. | 55/277 |

Primary Examiner—Sherman Basinger
Attorney, Agent, or Firm—Michael J. McGowan; James M. Kasischke; Prithvi C. Lall

[57] ABSTRACT

A system for positioning and sizing microbubbles in a liquid such as water. A first source of acoustic energy produces a first acoustic signal in the liquid, and a second source of acoustic energy produces a second acoustic signal in the liquid. The first and second sources of acoustic energy are positioned and aligned so they produce a standing wave field in the liquid. The standing wave field creates forces which position microbubbles at the antinodes or nodes of the standing wave field. By selecting a frequency for the acoustic signal and a frequency for the second acoustic signal which are slightly different, the standing wave field can cause the positioned microbubbles to move towards or away from a surface region in contact with the liquid.

19 Claims, 5 Drawing Sheets

MICROBUBBLE POSITIONING AND CONTROL SYSTEM

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

This invention relates to a microbubble positioning and control system, and more particularly, to a system for controlling the positioning of microbubbles near a Vessel's surface in water, using acoustic signals.

(2) Brief Description of the Prior Art

Ocean vessels and submarines encounter a great amount of drag when passing through water. The main cause of this drag in water is boundary layer turbulence at the wet surface of the vessel. The boundary layer is extremely thin. As the speed of the vessel increases, the boundary layer turbulence increases rapidly thereby increasing drag and preventing higher sustained speeds.

One well known technique for reducing drag is through gas bubbles injection at a porous surface into the boundary layer near the bow of a vessel. Bubbles, especially microbubbles with extremely small diameters, greatly reduce drag at the boundary layer, thereby increasing the speed and efficiency of the vessel. Microbubbles have been used for almost two decades in reducing drag on ocean vehicles. However, producing and maintaining a sufficient quantity of properly sized and positioned microbubbles in the boundary layer has been problematic.

The first problem is positioning the microbubbles within the boundary layer between the wetted surface of the vessel and the open water where the microbubbles can decrease turbulence and therefore reduce drag. In a system where gas is ejected through a porous surface into the water, a large portion of the bubbles are not positioned properly in the boundary layer and are wasted. Again, this is problematic if the vehicle is a submarine because of the volume of gas which must be stored. A system that positions the microbubbles into the boundary layer would greatly reduce the drag on the vehicle, without requiring a large amount of gas.

U.S. Pat. No. 4,398,925 discloses a method for positioning and moving bubbles in a liquid using acoustic energy. Acoustic energy is introduced into the liquid using a transducer. The acoustic energy reflects off an opposite surface of a container holding the liquid and reflects back to the acoustic transducer. A frequency is selected which creates a standing wave within the liquid. This acoustic standing wave has one or more antinodes, depending upon the frequency of the acoustic energy and the length of the container.

Antinodes in standing waves are places where the transmitted acoustic wave and the reflected acoustic wave cancel each other out. Bubbles will collect at these low pressure antinodes. Therefore, the '925 system discloses a method of positioning bubbles within a liquid volume using acoustic waves. Further, the '925 invention discloses changing the frequency harmonic of the transmitted acoustic signal, to create different antinodes to move the bubbles throughout the liquid solution.

This technique, however, will not work for a vessel in open water. U.S. Pat. No. 4,398,925 and U.S. Pat. No. 4,759,775 require a reflecting surface at a known distance to reflect the acoustic signal back to the source and create a standing wave field between the reflecting surface and the transmitting source. An ocean vessel, such as a ship or submarine, has no second reflective surface to reflect the sound waves.

Another problem is producing microbubbles of a preferred size, preferably on the order of 50 microns in diameter or less. The prior art approach is to eject gas through a porous surface into the boundary layer of an underwater surface. U.S. Pat. No. 5,117,882, for example, describes a microbubble generating and dispensing device utilizing felted metal fibers which are sintered to produce a porous surface for extruding a pressurized gas in the form of microbubbles into the boundary layer and using ultrasonic waves to help size the bubbles as they are produced.

However, no control is exercised over the size, position or distribution of the bubbles after they leave the porous surface. In order to maintain an efficient reduction in drag, a large amount of gas must be ejected through such a porous surface to maintain a preferred quantity of microbubbles in the boundary layer. The shortcoming of this drag reduction method is the large volume of gas which must be ejected, and hence carried on an underwater vehicle, to produce a significant level of drag reduction.

Accordingly, what is needed is a way of sizing bubbles near and at a boundary layer to produce a greater proportion of properly sized microbubbles suitable for reducing drag without using a large volume of gas to generate the bubbles.

Therefore, what is needed is a system for sizing and positioning microbubbles in the boundary layer proximate the outer surface of a vehicle. This will greatly reduce drag on the surface, while using a minimal amount of gas for creating the microbubbles.

SUMMARY OF THE INVENTION

Accordingly, a first object of this invention is to reduce turbulence induced drag at the boundary layer of a vessel.

Another object of this invention is to reduce drag by the provision of microbubbles at the surface of a vessel.

Yet another object of this invention is to maintain the microbubbles in the boundary layer of the vessel.

A further object of this invention is to use the microbubbles to provide steering for the vessel.

An additional object of this invention is to vary the heat transfer at the surface of the vessel.

Accordingly, this invention features a system for positioning and sizing microbubbles in a liquid. A first source of acoustic energy produces a first acoustic signal in the liquid, and a second source of acoustic energy produces a second acoustic signal in the liquid. The first and second sources of acoustic energy are positioned and oriented such that their acoustic signals interact to produce a standing wave field in the liquid. The standing wave field creates a force holding the microbubbles at antinodes within the standing wave field.

By selecting frequencies for the first and second acoustic signal which are slightly different, the standing wave field can cause the positioned microbubbles to move towards or away from a surface region in contact with the liquid.

A source of bubbles such as a tank of gas is used to introduce air bubbles into the liquid. The gas is introduced through a porous surface which produces bubbles at about the preferred size. When the liquid is moving, for example, when water is flowing by the hull surface of a ship, the introduced bubbles travel into the standing wave field produced by the two downstream sources of acoustic energy. The bubbles can then be swept towards the surface region and into the boundary layer, where they greatly reduce drag caused by the liquid moving against the surface region. The bubbles can also be swept away from the surface region to increase drag. Further, the two sources of acoustic energy can also size the bubbles to a preferred size (such as microbubbles) by periodically emitting a strong acoustic signal of predetermined frequency.

This system can be employed on a water vessel, including underwater vehicles such as submarines and torpedoes. Preferably, gas is ejected through a porous surface near the front of the vessel, and the resulting bubbles move into the standing wave field where they are sized and positioned near or in a desired location about the hull region of the vessel.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawing wherein.

DETAILED DESCRIPTION OF THE INVENTION

Figure 1:
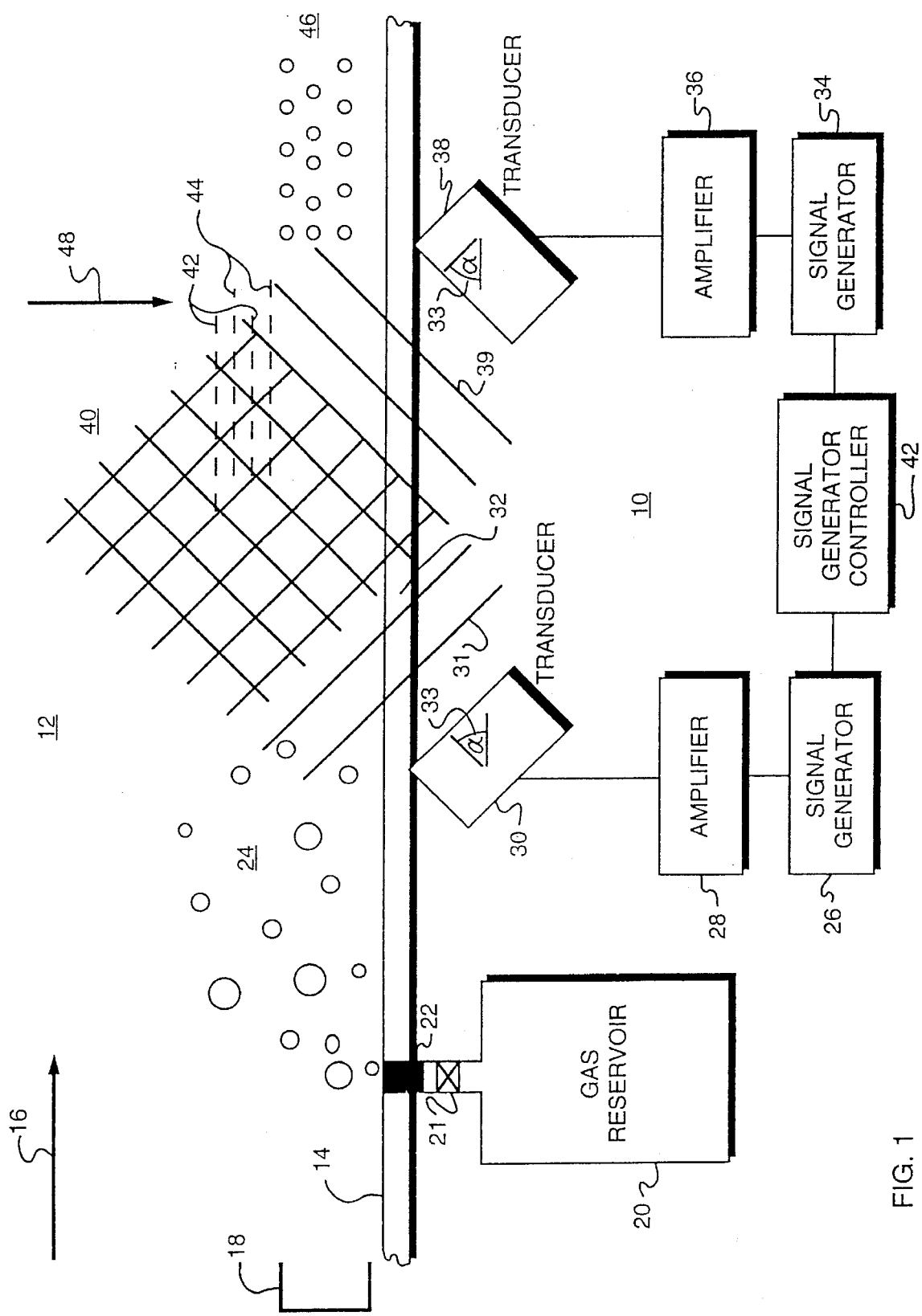
FIG. 1 is a schematic drawing of the system for sizing and positioning bubbles according to the present invention.

A microbubble positioning and control system 10, FIG. 1 which encompasses the present invention is used to position bubbles 24 in a liquid 12 such as sea water. Surface region 14 which may be the surface of a vessel or the side of a container, separates the components of system 10 from the liquid 12. A boundary layer comprises the wet surface of surface region 14 which is immediately in contact with liquid 12 and is generally shown by 18. An approximation of boundary layer thickness can be calculated from well known fluid dynamics expressions. For example:

$R_c$ = Reynold's Number of the flow field
U = Free stream velocity of the fluid flow
x = Position downstream along surface
v = Viscosity of the fluid
δ = Turbulent boundary layer thickness.

$$\delta = \frac{.376x}{\left(\frac{Ux}{v}\right)^{1/5}} \quad (1)$$

To reduce drag as the liquid 12 flows in a general direction as shown by arrow 16, bubbles 24, especially microbubbles, must be positioned within the boundary layer as shown by 18.

Bubbles 24 are first introduced into the liquid 12 from a gas reservoir 20. The gas is metered out and controlled by a valve 21. Valve 21 is controlled by control circuitry (not shown) based upon vehicle velocity and depth. The gas in gas reservoir 20 then passes through a porous surface 22 which introduces the bubbles 24 into the liquid 12. In the preferred embodiment, porous surface 22 is manufactured from sintered metal, as is well known in the art, providing pores of nominal 50 micron size. This allows the bubbles 24 to be of a small size, preferably about 50 microns in diameter, which is preferential for drag reduction. The bubbles 24 then flow in a direction generally indicated by arrow 16 along the surface 14 of the vessel.

A first source of acoustic energy such as a transducer 30 receives a signal from signal generator 26 which is amplified by amplifier 28. Transducer 30 then converts the amplified signal into acoustic energy, generally in the ultrasonic range which passes through acoustically transparent surface 32 and into liquid 12. Acoustically transparent surface 32 is typically made from synthetic or natural rubber having an acoustic impedance matching that of water. Ultrasonic energy is directional, and matching that of water. Ultrasonic energy is directional, and transducer 30 is arranged at an angle α 33, to insure that the ultrasonic waves energy 31 from transducer 30 travels at an angle relative to surface 14. In the preferred embodiment, the angle 33 of transducer 30 is 45 degrees from a line perpendicular to surface 14 in the direction of the liquid flow 16.

A second source of acoustic energy such as a second transducer 38 receives a signal from a second signal generator 34 which is amplified by second amplifier 36. The acoustic power required is approximately 5 watts, and the frequency range is 500 KHZ to 10 MHZ. Any amplifier having characteristics similar to the ENT Model 240L amplifier can be used. Second transducer 38 produces second ultrasonic acoustic waves 39 which also pass through acoustically transparent surface 32 and into liquid 12. Second transducer 38 is also positioned and angled by angle α, 33 which in the preferred embodiment is 45 degrees from the perpendicular of surface region 14, but is angled away from the flow 16 of liquid 12.

The interaction of acoustic waves 31 from first transducer 30 and acoustic waves 39 from second transducer 38 interact to produce a standing wave field 40. By adjusting the frequency produced by signal generator 26 and the frequency produced by signal generator 34, the acoustic frequency and wavelength of acoustic energy 31 and acoustic energy 39 can adjusted to modify standing wave field 40. Typically, if signal generator 26 and signal generator 34 produce signals at the same frequency but are 180 degrees out of phase, a standing wave field 40 will be created.

Standing wave field 40 will have a fringe pattern consisting of nodes as generally shown by dotted lines 42 and antinodes as generally shown by dashed lines 44. Depending upon the frequency of acoustic waves 31 and 39 and the positioning and angles of transducers 30 and 38, bubbles will tend to collect at either the nodes or the antinodes. Collection of bubbles 24 at the nodes or antinodes is dependent on the frequency of the standing wave field, the size of the bubbles, and the acoustic impedance properties of the fluid and bubble. In this application it is irrelevant whether bubbles are trapped at nodes or antinodes because multiple node/antinode bands exist within the boundary layer. Bubbles are locked at the node/antinode by differences in acoustic impedance between the bubble and the surrounding fluid. This effect can be used to "line up" the bubbles 24 as they pass through standing wave field 40 by flow of liquid 12 in direction 16.

By making the frequency of acoustic energy 31 and acoustic energy 39 different frequencies, a wave field 40 which "travels" is created. This dynamic motion a sweeping motion which allows particles to be moved in various directions including towards surface 14 as generally shown by arrow 48 or conversely away from surface 14 in the opposite direction of arrow 48. The velocity of the movement of the moving wave field is given by the formula:

$$V_1 = D_f (F_1 - F_2) \qquad (2)$$

wherein the fringe velocity $V_1$ is equal to the spacing, $D_f$, times the frequency shift which is frequency $F_1$ minus frequency $F_2$. The spacing, $D_f$, is defined as follows:

λ=Average wavelength of $F_1$ and $F_2$ $$D_f = \frac{\lambda}{2\sin(\alpha)} \qquad (3)$$

Using these formulas for the preferred embodiment, the transducers 30 and 38 are angled at 45 degrees ($\alpha$). With a nominal frequency of one megahertz, where the difference between the first frequency $F_1$ and second frequency $F_2$ is approximately 2875 hertz, producing a fringe spacing of 1,060 microns with a fringe velocity $V_1$ of approximately 3 meters per second. Velocity $V_1$ is in the direction towards or away from surface 14 as generally shown by arrow 48 or the direction opposite arrow 48. With gas bubbles 24 ejected from gas reservoir 20 at a rate to obtain a bubble cloud with a void fraction in the boundary layer of approximately 5 percent, the majority of the bubbles 24 may be positioned within the boundary layer 18 as shown by 46 for a nominal depth of 200 feet and a speed of 50 knots with vast turbulence and drag reduction.

The frequency differentiation control is done by a signal generator controller 42 which is connected to the first signal generator 26 and the second signal generator 34.

The ultrasonic energy 31 and 39 produced by transducers 30 and 38 can also be used to properly size bubbles 24. It is well known that ultrasonic energy can be used to reduce the size of bubbles or conversely increase the size of bubbles to a preferred size, depending upon the frequency and strength of the ultrasonic waves. In the preferred embodiment of the present invention, the strength and frequency of acoustic waves 31 and 39 may be pulsed between a strong signal of equal frequency to size the microbubbles to a preferred size, and then switched to two separate frequencies to produce a standing wave field 40 to sweep the bubbles into or away from boundary layer 18. In the preferred embodiment, the microbubbles are sized to approximately 50 microns using a frequency of 10 MHz and a power of 5 watts Therefore, this system allows the bubbles to be both properly sized and properly positioned for significant drag reduction.

Figure 2:
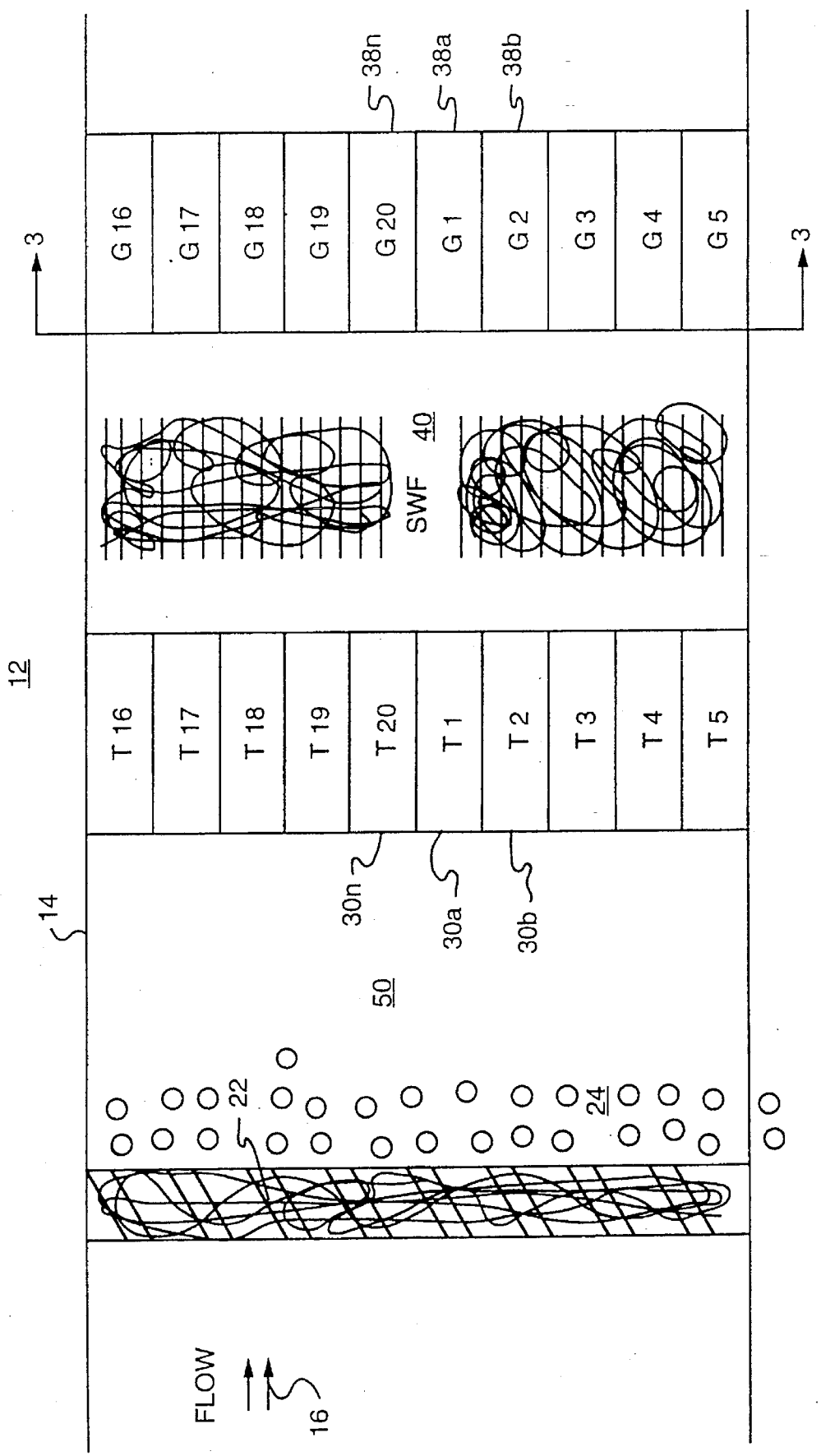
FIG. 2 is a top view of a surface of a sea vessel such as a torpedo, displaying the positioning of transducers and the standing wave field.
Figure 3:
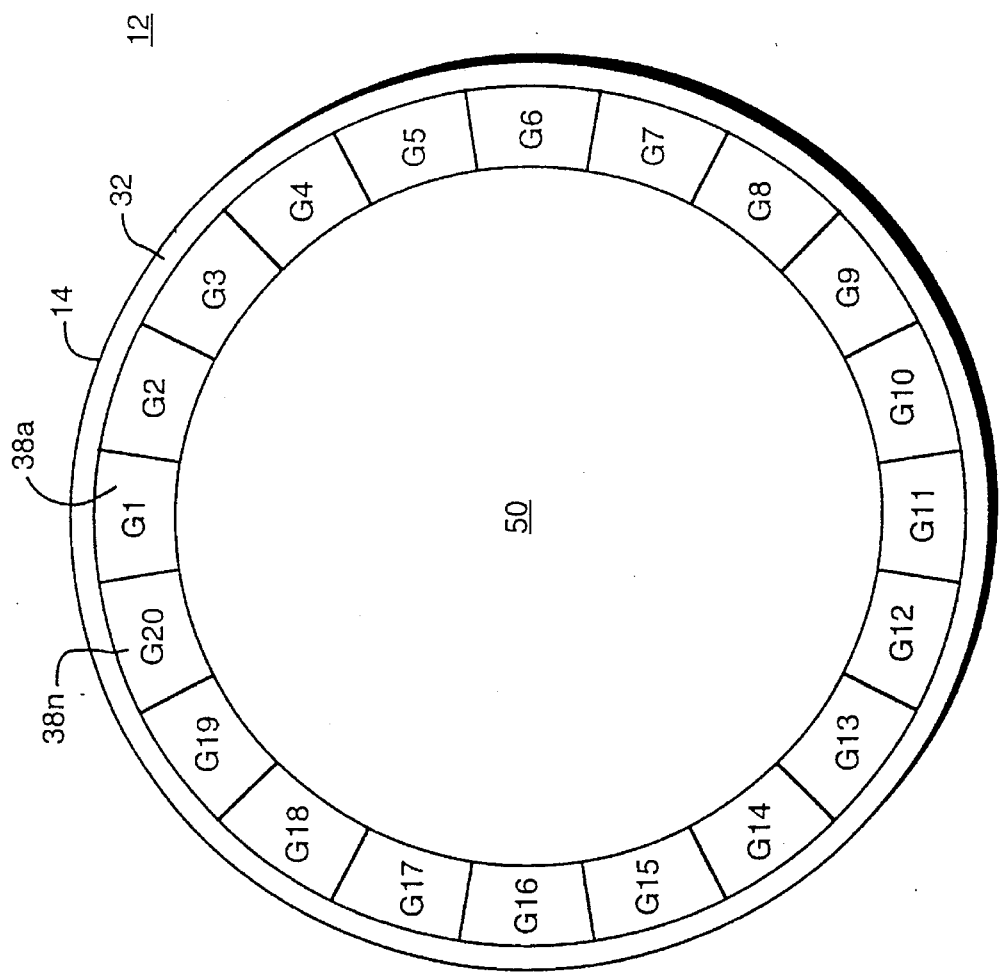
FIG. 3 is a cross section of the sea vessel in FIG. 2 showing the positioning of transducers.

This system can be employed to reduce drag on an underwater vessel 50, FIG. 2, such as a torpedo or submarine. The vessel 50 is completely immersed in water 12 with a surface 14. As vessel 50 moves through water 12, the flow of water 16 is along the entire surface of vessel 50. To reduce drag, bubbles 24 are first ejected out through porous ring 22 which circumvents the surface of vessel 50. A first ring of transducers 30a–n, produce a first ultrasonic wave traveling generally away from surface 14 and in direction of flow 16. A second set of transducers 38a–n produce a second ultrasonic wave traveling generally away surface 14 from and against the flow 16. This creates the standing wave field 40 in between the transducers 30 and 38. A transducer ring 38 shown in FIG. 3, completely surrounds the surface 14 of vessel 50. This provides turbulence reduction around the entire perimeter of vessel 50. In the preferred embodiment, several sets of transducer pairs 30, 38 can be used along the surface of vessel 50 to reduce drag. For example, in a torpedo with a 21 inch diameter cylinder and a length of 20 feet, six sets of transducer rings can be spaced along the hull of the vessel along with two gas outlet rings to reduce drag along the entire surface of the torpedo, allowing it to maintain a greater speed.

Particular transducer pairs 30, 38 can be activated independently to reduce drag at a particular region of vessel 50. By activating transducers on one side of vessel 50, a drag differential can be created. This drag differential can allow maneuvering of vessel 50 without the use of a rudder.

Figure 4:
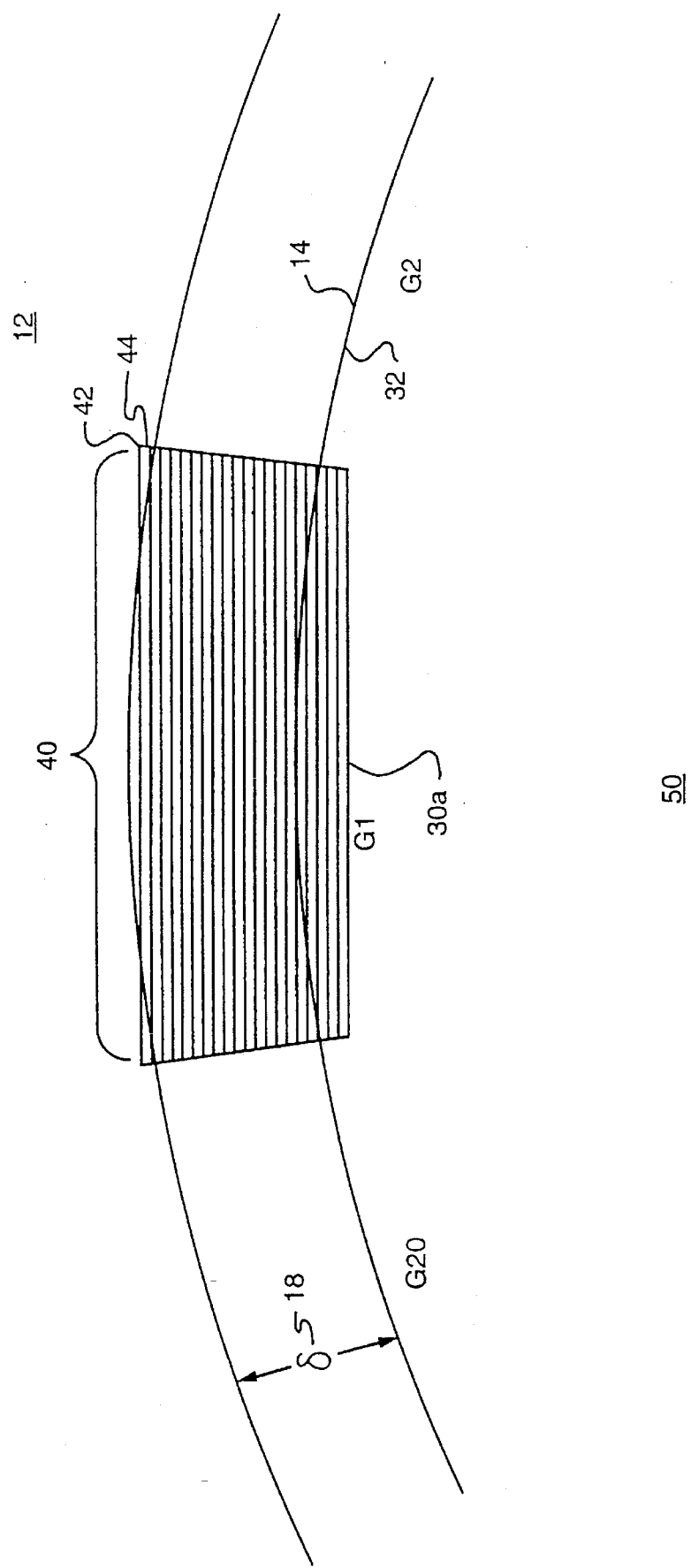
FIG. 4 is a surface detail showing the standing wave field on the surface of a vessel.

Standing wave field 40, FIG. 4, extends roughly parallel to surface 14 of vessel 50 with alternating layers of nodes 42 and antinodes 44.

By varying the frequencies to transducers 30 and 38 and adjusting the angle ∝ of transducers 30 and 38, different standing wave field orientations are created with different effects on surface 14, including increasing or decreasing turbulence, steering, and increased heat transfer. With bubbles or particles 24, FIG. 5a flowing parallel to surface 14, a standing wave field orientation can set up parallel to such bubbles wherein the bubbles will align with the antinode fringes 44. With an intense ultrasonic field, bubbles 24 will quickly align with antinode fringes 44, with a weaker field, bubbles 24 will slowly align with the standing wave field 40 and antinodes 44.

Figure 5:
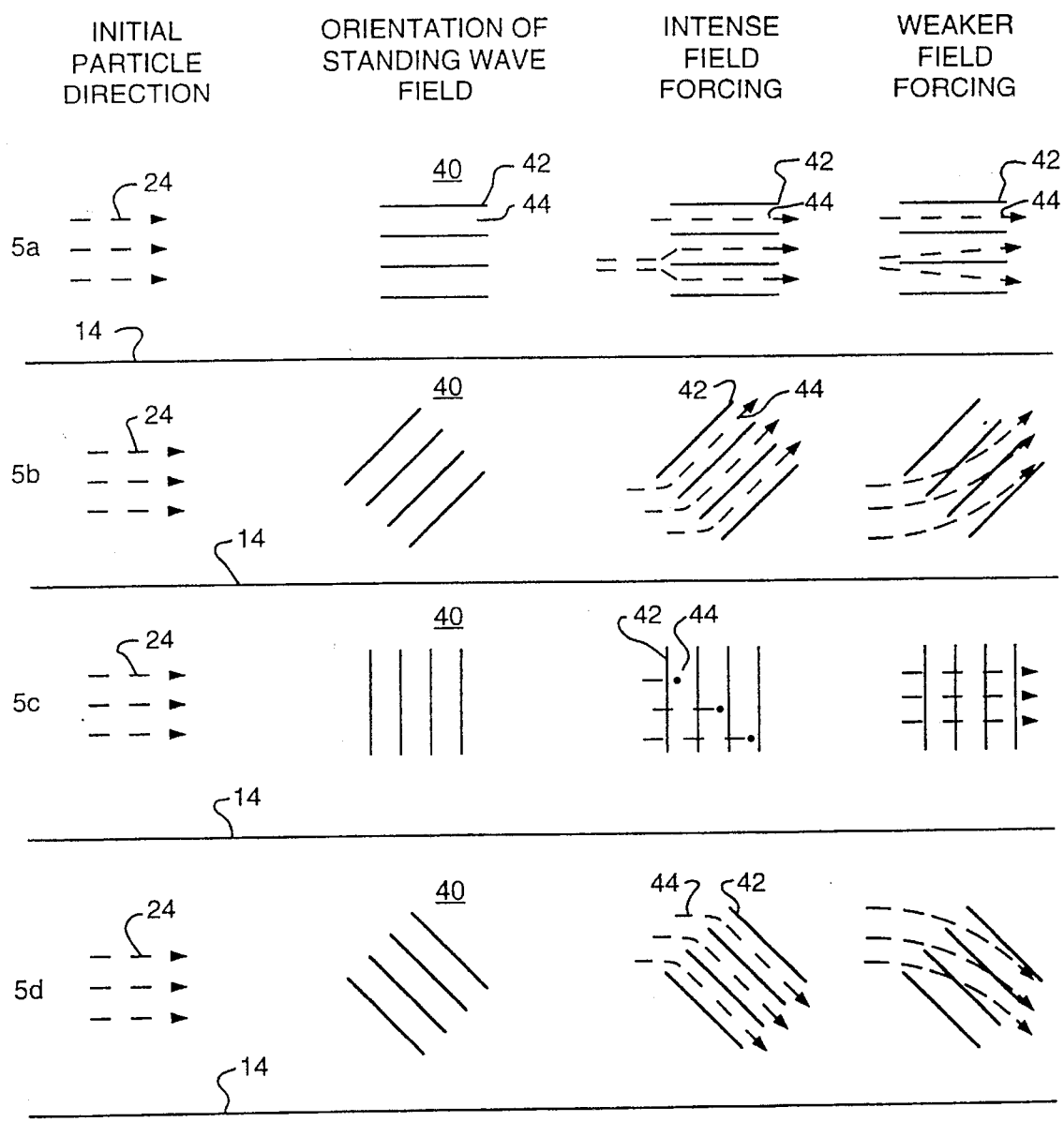
FIG. 5 is a table showing how different orientations of the standing wave field can affect particle flow.

With a standing wave field 40, FIG. 5b arranged diagonally away from surface 14, bubbles 24 will be swept generally away from surface 14. This effect can be used to steer the vehicle by forcing bubble and liquid flow away from the surface 14 thereby applying force to surface 14, which can steer vessel 50. Alternatively, this effect may also be used for heat transfer away from surface 14. As bubbles 24 and liquid 12 flow next to surface 14, they will collect heat from surface 14. If the particles and liquid are then forced away from surface 14, cooler liquid 12 will replace the heated liquid transferred away from surface 14, thereby cooling surface 14.

Standing wave field 40, FIG. 5c can also be oriented roughly vertical to surface 14. This will in effect "trap" bubbles 24 in antinodes 44 thereby providing a general slowing mechanism of the particles 24 and liquid 12. This effect may be used for braking the vehicle 50. It may also be used to vastly increase turbulence on surface 14, which may be used for braking as well as heat transfer or other desired effects.

The standing wave field 40, FIG. 5d may also be arranged generally towards surface 14 so that bubbles 24 are swept towards surface 14. This may be used for steering, or also for the general stated purpose of positioning particles such as bubbles close to surface 14 to reduce turbulence in the boundary layer.

Although the present invention has been described for use in an underwater vehicle such as a torpedo or submarine, this technique can be employed with any surface in contact with a moving liquid, including ship hulls, fluid pipes and conduits, water troughs, aquaducts, sluice tanks, and any other surfaces. This invention is especially useful for high speed flows of liquids, or vehicles moving at high speeds by greatly reducing turbulence. Turbulence reduction not only allows for higher speeds for a vehicle and/or the fluid but also decreases the noise produced by an undersea vehicle traveling at high speeds.

Accordingly, the present invention provides an inexpensive and efficient way to vastly increase the percentage of microbubbles in the boundary layer of a surface in contact with a liquid. Gas ejected from the bow of a vessel is used much more efficiently, thereby requiring less gas for the desired effect. Greatly enhanced speeds may be attained and maintained using the present invention.

Many modifications of the presently disclosed invention will become apparent to those of skill in the art without departing from the scope of the appended claims.

What is claimed is:

1. A system for positioning bubbles contained in liquid, comprising:
   at least a first source of acoustic energy disposed in acoustic contact with said liquid containing said at least a first acoustic signal having a first frequency;
   at least a second source of acoustic energy disposed in acoustic contact with said liquid containing said bubbles for producing in said liquid containing bubbles at least a second acoustic signal having a second frequency; and
   wherein said at least a first source of acoustic energy and said at least a second source of acoustic energy are spatially positioned and oriented proximate each other so that said at least a first acoustic signal and said at least a second acoustic signal interact at an angle which is substantially perpendicular and cooperate to produce a three-dimensional standing wave field in said liquid containing said bubbles, said three-dimensional standing wave field positioning said bubbles proximate a predetermined location within said liquid containing said bubbles.

2. The system as claimed in claim 1, further comprising a source of bubbles for introducing said bubbles into said liquid to form said liquid containing said bubbles.

3. The system as claimed in claim 2, wherein said source of bubbles comprises:
   a gas reservoir;
   a valve in communication with said gas reservoir; and
   a porous surface in communication with said valve and exposed to said liquid for introducing said bubbles into said liquid from said gas reservoir.

4. The system of claim 1, further comprising a surface region in fluid contact with said liquid containing said bubbles, said first and second sources positioning said bubbles proximate said surface region.

5. The system of claim 4, wherein said liquid containing said bubbles is moving generally parallel to said surface region.

6. The system of claim 5, wherein said first and second source position said bubbles in a boundary layer of said surface region to reduce drag from said liquid containing said bubbles moving parallel to said surface region.

7. The system of claim 5, wherein said first and second sources position bubbles in a boundary layer of an area of said surface region to create a drag differential at different areas of said surface region.

8. The system of claim 5, wherein said at least a first acoustic signal first frequency and said at least a second acoustic signal second frequency are of different frequencies producing a moving wave field for positioning and moving said bubbles in said liquid containing said bubbles.

9. The system of claim 8, wherein said moving wave field positions and moves said bubbles towards said surface region.

10. The system of claim 8, wherein said moving wave field positions and moves said bubbles away from said surface region.

11. The system of claim 5, wherein said surface region includes a hull of a vessel.

12. The system of claim 11, wherein said vessel includes an underwater vehicle.

13. The system of claim 1, further including at least one acoustic energy source controller coupled to said at least a first source of acoustic energy and said at least a second source of acoustic energy, for periodically altering said at least a first acoustic signal first frequency and said at least a second acoustic signal second frequency from common first and second frequencies to size said bubbles to a preferred size, and differing first and second frequencies to position said bubbles.

14. The system of claim 1, wherein said bubbles are microbubbles.

15. The system of claim 14, wherein said microbubbles are less than 50 Microns in size.

16. A system for positioning bubbles proximate a hull of a vessel in water comprising:
   a bubble source positioned in said hull for introducing bubbles into said water proximate at least one region of said hull of said vessel;
   at least a first acoustic source disposed proximate said hull and in acoustic contact with said water for producing at least a first acoustic waveform at a first frequency in said water;
   at least a second acoustic source disposed proximate said hull of said vessel and in acoustic contact with said water for producing at least a second acoustic signal at a second frequency in said water; and
   wherein said a first acoustic source and said second acoustic source are spatially positioned and oriented proximate each other such that said first acoustic waveform and said second acoustic waveform interact and cooperate to produce a standing wave field in said water proximate said hull of said vessel, said standing wave acting to position said bubbles in said water proximate said at least one region of said hull of said vessel.

17. A system for positioning bubbles contained in a liquid, said liquid containing said bubbles moving generally parallel to a surface region in fluid contact with said liquid containing said bubbles, comprising:
   at least a first source of acoustic energy disposed in acoustic contact with said liquid containing said bubbles for producing in said liquid containing bubbles at least a first acoustic signal having a first frequency;
   at least a second source of acoustic energy disposed in acoustic contact with said liquid containing said bubbles for producing in said liquid containing bubbles at least a second acoustic signal having a second frequency; and
   wherein said at least a first source of acoustic energy and said at least a second source of acoustic energy are spatially positioned and oriented proximate each other so that said at least a first acoustic signal and said at least a second acoustic signal interact and cooperate to produce a standing wave field in said liquid containing said bubbles, said standing wave field positioning said bubbles within a boundary layer of said surface region to reduce drag from said liquid containing said bubbles moving parallel to said surface region.

18. A system for positioning bubbles contained in a liquid, said liquid containing said bubbles moving generally parallel to a surface region in fluid contact with said liquid containing said bubbles, comprising:

at least a first source of acoustic energy disposed in acoustic contact with said liquid containing said bubbles for producing in said liquid containing bubbles at least a first acoustic signal having a first frequency;

at least a second source of acoustic energy disposed in acoustic contact with said liquid containing said bubbles for producing in said liquid containing bubbles at least a second acoustic signal having a second frequency; and wherein said at least a first source of acoustic energy and said at least a second source of acoustic energy are spatially positioned and oriented proximate each other so that said at least a first acoustic signal and said at least a second acoustic signal interact and cooperate to produce a standing wave field in said liquid containing said bubbles, said standing wave field positioning said bubbles within a boundary layer of said surface region to create a drag differential between said liquid and said surface region at different areas of said surface region.

19. A system for positioning bubbles contained in a liquid, comprising:

at least a first source of acoustic energy disposed in acoustic contact with said liquid containing said bubbles for producing in said liquid containing bubbles at least a first acoustic signal having a first frequency;

at least a second source of acoustic energy disposed in acoustic contact with said liquid containing said bubbles for producing in said liquid containing bubbles at least a second acoustic signal having a second frequency;

at least one acoustic energy source controller coupled to said at least a first source of acoustic energy and said at least a second source of acoustic energy, for periodically altering said at least a first acoustic signal first frequency and said at least a second acoustic signal second frequency from common first and second frequencies to size said bubbles to a preferred size, and differing first and second frequencies to position said bubbles; and wherein said at least a first source of acoustic energy and said at least a second source of acoustic energy are spatially positioned and oriented proximate each other so that said at least a first acoustic signal and said at least a second acoustic signal interact and cooperate to produce a three-dimensional standing wave field in said liquid containing said bubbles, said three-dimensional standing wave field positioning said bubbles proximate a predetermined location within said liquid containing said bubbles.

* * * * *